Figure 1:
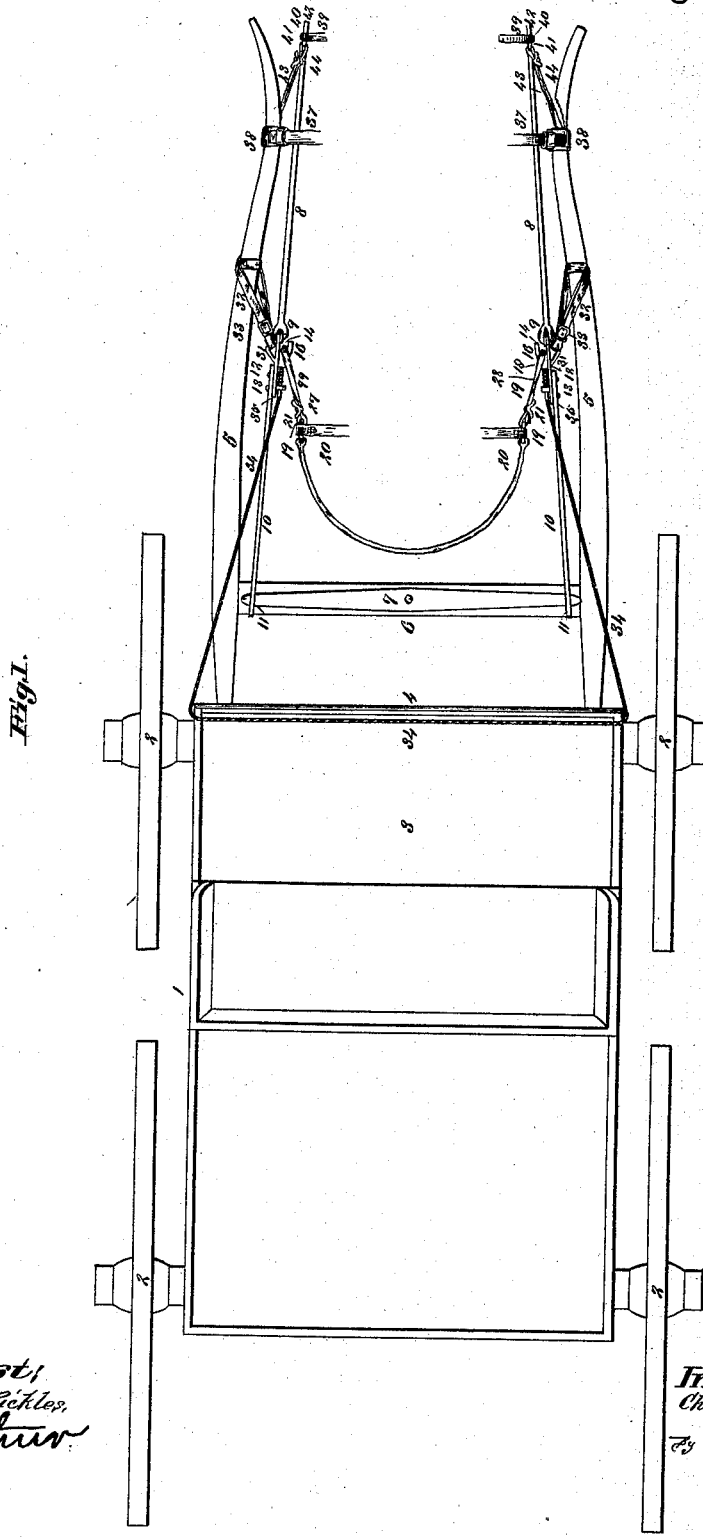

(No Model.)
2 Sheets—Sheet 1.

C. D. HILL.
HORSE DETACHER.

No. 410,097.
Patented Aug. 27 1889.

Attest;
Charles Pickles,
E. Arthur

Inventor;
Charles D. Hill.
By Knight Bros
atty's.

(No Model.) 2 Sheets—Sheet 2.
C. D. HILL.
HORSE DETACHER.
No. 410,097. Patented Aug. 27 1889.
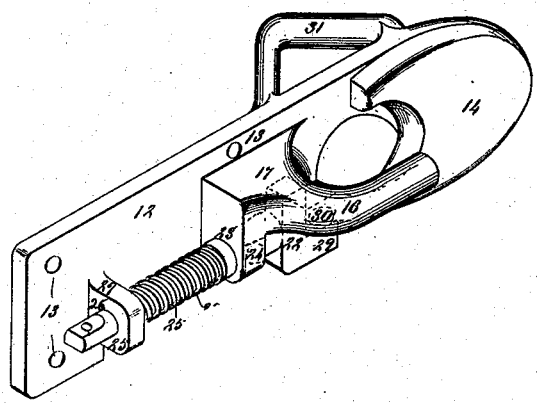
Fig. II.
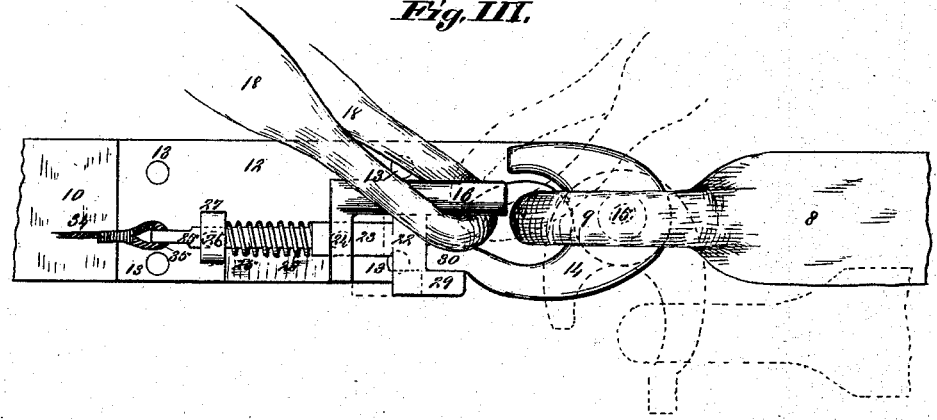
Fig. III.
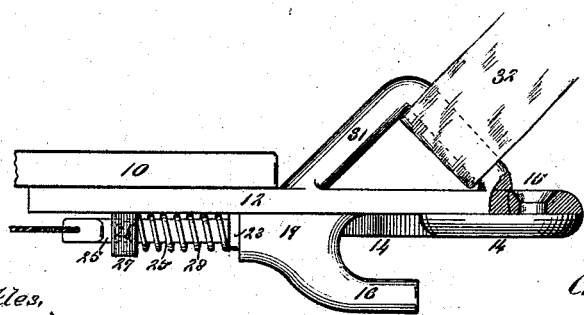
Fig. IV.
Attest:
Charles Pickles,
E. Arthur
Inventor:
Charles D. Hill.
By Knight Bro's.
Atty's.

UNITED STATES PATENT OFFICE.

CHARLES D. HILL, OF ST. LOUIS, MISSOURI, ASSIGNOR OF ONE-HALF TO ELIHU BLACK, OF MONMOUTH, ILLINOIS.

HORSE-DETACHER.

SPECIFICATION forming part of Letters Patent No. 410,097, dated August 27, 1889.

Application filed December 4, 1888. Serial No. 292,630. (No model.)

*To all whom it may concern:*

Be it known that I, CHARLES D. HILL, of the city of St. Louis, in the State of Missouri, have invented a certain new and useful Improvement in Safety Horse Hitchers and Detachers, of which the following is a full, clear, and exact description, reference being had to the accompanying drawings, forming part of this specification.

This invention relates to a sectional tug-harness, means for the detachment of the sections of said tugs and detachment of the horse from the vehicle to which he has been secured; and the invention consists in features of novelty hereinafter fully described, and pointed out in the claims.

Figure I is a top view of a vehicle with my detachment devices secured thereto. Fig. II is an enlarged detail perspective view, and shows my sectionally-combined tug and holdback-hooks in their closed position and detached from the harness. Fig. III is an enlarged detail view, and shows the said hooks in full lines closed, with the tug and holdback-strap engaged therein; it also shows the spring-latch and its operating-cord, and shows in broken lines the relative positions of said latch when drawn, the pivotally-turning tug-hook, and the detaching-tug and breeching-strap; and Fig. IV is an enlarged detail edge view, and shows the hooks closed, with part of the attachment-plate broken away to show the pivot-pin on which the tug-hook turns, and also shows the loop that carries the shaft or outer holdback-strap.

Referring to the drawings, 1 represents a vehicle to which the detacher is connected. 2 are the wheels of said vehicle, 3 the body, 4 the dash-board, 5 the shafts, 6 the cross-tree of the shafts, and 7 the singletree.

8 represents the forward sections of one of the tugs, having a loop 9. 10 represents the rear section of said tug, and 11 the hitch-loop of the same.

I will now proceed to describe the detaching devices by which the fore and rear sections of the tugs, the breeching holdback and outer holdback or shaft straps are disconnected, leaving the rear sections of the tugs, the shaft-straps, and the metallic combined coupling and detaching device with its operating-cord still secured to the buggy and its shafts and singletree, and the fore sections of the tugs and other parts of the harness going with the horse. I will describe one tug and its parts only.

12 represents a plate, which carries the combined coupling and detaching device, and which is secured to the part 10 of the tug by rivets 13.

14 represents a hook, which is secured to the plate 12 by a pin or rivet 15, on which it freely turns when tripped.

16 is a holdback-hook, which projects forward from a bracket 17, which is integral with, and consequently permanently secured to, the plate 12. The hook 16 receives the holdback-straps 18, which straps pass through the rings 19 of the breeching 20, and the ends of said strap are secured together by the buckles 21.

22 represents a sliding trigger, the heavy end 23 of whose stem works in the loose bearing 24 within the bracket 17, and the reduced end 25 of said stem works in a loose bearing 26 in a lug 27, that projects from near the rear end of the plate 12, and is preferably integral therewith. A spiral spring 28 is mounted on the reduced end of the stem, and one end of the spring impinges against the lug 27, while the other bears against the shoulder formed by the increased diameter of the forward end of the stem. Thus the trigger is projected forward by said spring to cause a lug 29 thereon to engage a corresponding lug 30 on the rear of the hook 14, and the hook 14 then retains its hold of the section 8 of the tug.

31 represents a loop on the outside of the plate 12, through which passes the outer holdback or shaft strap 32, which is wrapped around and secured to the shafts in the usual manner, and the ends of said strap are attached together by a buckle 33. It will thus be seen that the rear section of the tug always remains with the shafts and singletree, to which it is secured.

34 is the actuating-cord that is secured to the trigger 22 by passing it through a perforation 35 at the back ends of the same. The cord passes around the dash-board, so as to be convenient to the occupants of the vehicle. Should a horse be running away, all that is required is for the operating-cord to be drawn on, thereby pulling the sliding triggers and tripping the tug-hooks 14, which immediately turn on their pivots and release the tugs. The way is thus also opened for the release of the holdback breeching-straps, which the horse draws from the hooks on which they are seated as it leaves the shafts and vehicle behind. (See Fig. III, in which the parts in their releasing positions are shown in dotted lines.) The actuating-cord is preferably made of woven or twisted wire. The cord 34 (when not operated) has sufficient slack to allow the side draft on the harness in turning corners without thereby tightening the cord on either side, and thus tripping the detacher.

37 represents a back-band of the harness, and the loose pendent loops 38 of which seat the points of the shafts, forming shaft-bearers to hold them up when the horse is hitched thereto.

39 represents a neck-strap that passes over the horse's shoulders, and whose terminal loops 40 engage in rings 41, which are secured to the sections 8 of the tugs, an extension of which forms the breast-strap 42.

43 represents releasing-straps, which pass through the rings 41 and pass through the lower part of the loops 38 of the back-band, from which said straps return and engage in the buckles 44, that are secured to their initial ends. These releasing-straps are an important feature in the invention, as when the horse has been otherwise detached, as described, at the junction of the sectional tugs, the said loops of the back-band might (were it not for these releasing-straps) retain their hold of the shafts and the detachment be incomplete, whereas by the draw from the back-band above and the releasing-straps beneath the loops 38 are released from the shafts with so little friction that the danger of a mishitch at the shafts is thereby removed.

It will be seen that in the connection of my sectional tugs and holdback-straps with the hooks and releasing devices I have provided for the contact of leather with metal, so as to avoid the objectionable feature of bringing metal to metal in either the forward tug-draft or rear breeching-draft. By this means I avoid the difficulty accruing from the rapid wear of two metal surfaces (that are constantly in motion) against each other, and the objectionable incessant rattling of the parts against each other. It will also be seen that all points of weakness that would be liable to frequent breakage have been avoided in the construction of the device, and that the movement of the running horse and the individual action of the several parts of the detaching device all co-operate for the speedy release of the horse from the vehicle.

Not only is my invention of use to prevent injury to the occupants of the vehicle, the vehicle itself and its contents, and reduce the likelihood of damage to the horse itself and people along the line of run, but it is also a convenience in hitching up and unhitching, as the detachment is at the junction of the sectional tugs, the rear section of which, the detachment devices, and the shaft holdback-strap all remain with the vehicle. It will thus be seen that the old plan of handling muddy tugs and holdback-straps and tying tugs in knots (to do them up when unhitching) is avoided, and the driver can unhitch while seated in the vehicle, leaving nothing to do up but the lines.

The detaching devices, as shown in Figs. II, III, and IV, are for the nigh or near side. Those for the off side are exact duplicates, except that they are constructed rights and lefts, so that the trip is downward in both cases, as shown in Fig. I. It will also be seen that when the horse has been detached then by the continued retention of said cord 34 until the impetus given to the vehicle by the running horse is exhausted the points of the shafts are retained in elevation, so as not to strike the ground, for the outer holdback or shaft straps connect the angle-loops on the plate that carries the detacher devices with the shafts near their points, and not only is this fruitful cause of accident from the dropping of the shafts and their points running into the ground and upsetting the vehicle thus avoided, but also the shafts, and with them the front wheels, can by the use of the cord be directed to guide the vehicle either straight ahead or to the right or left to prevent running over obstructions, &c., and the upsetting of the vehicle.

The two separate or sectional holdback-straps on each side of the horse, the inner ones from the breeching to the holdback-hooks of the detacher devices, and the outer ones from the angle-loops on the bearer-plates of said devices provide the means for a divisional holdback arrangement that is one of the important features of this invention. It will be seen that the inner holdback-straps thus being connected with the breeching, which the horse carries with him when he is detached, at their other ends easily release their holds of the holdback-hooks when brought into the position shown in broken lines in Fig. III, the holdback-hooks remaining with the detachment devices, the rear section of the tugs, and the vehicle. At the same time the outer holdback-straps always retain their hold of the loops of the plates 12 of the detaching devices and of the shafts, and after the horse has left the shafts the said outer holdback-straps are still of essential service, as stated above, to connect the line of attachment from the actuating-cords to said shafts to enable the driver to hold the points of the shafts from falling on the ground, and to direct the course of the vehicle clear of obstructions while exhausting the impetus given to it by the running horse. The portion of the inner holdback-straps that engages with the holdback-hook (shown in Fig. III) is rounded, so that not only will it the better sustain the wear, but also, being round, it will leave the holdback-hook without binding as the horse moves off after his detachment; also, previous to the detachment of the horse, the round rolls cannot become detached from their seat on the holdback-strap, for there is not room for them to pass through between the point of said hooks and the loops of the forward sections of the tugs.

It will be seen that the rear ends of the forward sections of the tugs are rolled or rounded at the point of friction with the tug-hooks 14, and are bent around to form the loops 9, that engage with said hooks, the extreme ends of the straps being doubled back to counterlap the main body of the tugs to which they are stitched. Hitch-loops are thus formed that do not weaken the tugs, as do the usual perforations for the seating of the singletree. Besides, said perforations would provide a wrong presentation for the attachment to said pivotal tug-hook 14, and the loop makes a stronger and more durable attachment than could be obtained even by the usual practice of doubling the ply, which makes the tug inconveniently clumsy. It is also much more durable, as well as more convenient, than by the attachment of metal plates on the forward section of the tugs, as the forward edges of said plates cut and crack the leather tug at their line of junction.

In placing the hook 14 so as to open downward it makes it automatic in detaching the horse when the releasing-pin is withdrawn, as the hook naturally drops downwardly, thereby insuring an unhitch, whether the draft is on the tugs or not; hence this feature is a valuable one in the "hitch" alone; but it is more valuable in combination with the loop on the front section of the tug, for only through this process of opening the hitch downwardly are we enabled to use a leather loop attached or made integral with the tug.

It is obvious that the usual buggy-tug is but one ply of leather where it is severed to apply the hitch, and if a slot or perforation be made in the forward severed end for connecting it with the hitch the tug is necessarily weakened, and if pieces of leather are added to make the perforated part thicker and stronger, then the opening in the hitch must be to either side and the advantage of gravity or automatic action lost when unhitching. The plates 12 are of course placed on the inner sides of the tugs and are made rights and lefts, so that the openings in both are downward.

I claim as my invention—

1. In a detacher, the sectional tug, in combination with a hook pivoted to one section of the tug and adapted to open downward, and a retaining-trigger, substantially as and for the purpose set forth.

2. In a detacher, the combination of the sectional tugs, the plates secured to the rear sections of said tugs, the pivoted hooks 14, and the sliding triggers that release said hooks, substantially as and for the purpose set forth.

3. In a detacher, the combination of the sectional tugs, the plates secured to the rear sections of said tugs, the hooks pivoted to said plates, and which engage with the forward sections of said tugs, and the holdback-hooks 16, secured to said plates, substantially as and for the purpose set forth.

4. In a detacher, the combination of the sectional tugs, the plates secured to the rear sections of the tugs, the pivoted hooks, the holdback-hooks, the straps that connect said holdback-hooks to the breeching, the sliding spring-trigger, the catch 29 on the end of said trigger, that engages the said pivoted hooks, and the actuating-cord, substantially as and for the purpose set forth.

5. In a detacher, the combination of the sectional tugs and their detaching devices, the plates that carry said devices, the loops 31, and the outer holdback-straps that engage with said loops and are secured to the shafts, substantially as and for the purpose set forth.

6. In a detacher, the combination of the sectional tugs, the plates that carry the detaching devices, and which are secured to the rear sections of the tugs, the pivoted hooks, the holdback-hooks, the sliding triggers that release the tug-hooks, the actuating-cord that operates said triggers, and the sectional or separable holdback-straps, the inner ones of which connect from the holdback-hooks to the breeching, the outer ones that connect from the loops of the bearer-plates to the shafts, and the rounded hitch-loops 9 on the forward sections of the tugs, which loops engage with said pivoted hooks, substantially as and for the purpose set forth.

7. In a detacher, the combination of the loop 31 and hook 16, and the double holdback-straps 32 and 19, combined and operating substantially as and for the purpose set forth.

8. In a detacher, the combination of the sectional tugs and their detaching devices, the back-band having pendent loops that support the shafts, the neckband and breast-strap, the rings 41, that connect said neckband, breast-strap, and the fore sections of the tugs, and the releasing-straps 43, that connect the pendent loops that carry the shafts with said rings 41 and facilitate the disengagement from the shafts, substantially as and for the purpose set forth.

CHARLES D. HILL.

In presence of—
BENJN. A. KNIGHT,
EDW. S. KNIGHT.